United States Patent Office 3,126,381
Patented Mar. 24, 1964

3,126,381
2-BENZYL-3-PHENETHYLTETRAHYDRO-
PYRIMIDINES
André L. Langis, St. Laurent, Quebec, and Cedric A.
Pilkington, Dorval, Quebec, Canada, assignors to
American Home Products Corporation, New York,
N.Y., a corporation of Delaware
No Drawing. Filed Mar. 1, 1962, Ser. No. 176,790
Claims priority, application Canada Mar. 2, 1961
4 Claims. (Cl. 260—251)

The present invention relates to 1-(β-phenethyl)-2-benzyl-3,4,5,6-tetrahydropyrimidine and to its 6-methyl homolog.

These compounds, in the form of the bases or salts, have useful bronchodilator and anti-histaminic properties. These properties are also present in the pharmacologically acceptable salts of the above compounds. The hydrohalide salts are preferred as they may be administered orally, by subcutaneous injection, or as an aerosol. Other compounds of the invention are useful as intermediates.

When administered orally, subcutaneously, or as an aerosol, the anti-histaminic activity of the active compounds of the invention may be demonstrated in vivo by the guinea pig aerosol test described by C. H. Siegmund, J. Pharm. Exp. Therap., vol. 90, p. 254 (1947), and in vitro by the Magnus test on the isolated guinea pig ileum. Their bronchodilator activity may be shown in the cat using the test method of Konzett described in Arch. für Exper. Pathol. Pharmakol., vol. 195, p. 71 (1940), and by the guinea pig aerosol test mentioned above.

Further advantages of the active substances of the invention are that they do not act like sympathomimetic amines and their salts, as may readily be demonstrated in tests on the spontaneous activity of the rat uterus or the guinea pig ileum. Neither do they cause damage to the heart characteristic of the catechol amines, no significant effect on heart rate or blood pressure being demonstrable in the dog, nor any evidence of tachycardia. Still further advantages are that the substances cause neither stimulation nor depression of the central nervous system and that they possess a long duration of bronchodilator activity after oral administration.

For use as pharmacologically active substances, the compounds of this invention in the form of their pharmacologically acceptable salts, preferably the hydrohalide salts may be compounded in a known manner to form novel compositions. For example, they may be compounded with pharmaceutically acceptable carriers, such carriers consisting of e.g. starch, lactose, aluminum and magnesium stearates, and possibly other functional agents. The mixtures may be prepared and granulated, ground, and pressed into tablets in the usual manner. For subcutaneous or aerosol use the active material may be put up in sterile aqueous isotonic solution.

Preferred preparation procedures are as follows:

β-phenethylamine (1) is heated to reflux with acrylonitrile (IIa) to obtain 3-(β-phenethylamino) propionitrile (IIIa). The latter may be reduced either with lithium aluminum hydride or with hydrogen in the presence of Raney nickel and ammonia to yield 3-(β-phenethylamino)propylamine (IVa). The latter diamine (IVa) may be reacted either with phenylacetic acid, or with ethyl phenylacetate, or with phenylacetonitrile to yield 1-(β-phenethyl)-2-benzyl-3,4,5,6-tetrahydropyrimidine (VIIIa) which may then be converted to one of its pharmacologically acceptable salts.

Alternatively, ethyl phenylacetate (V) may be reacted under pressure with 1,3-propanediamine (VI) to yield 2-benzyl-3,4,5,6-tetrahydropyrimidine (VII). The latter may then be refluxed in isopropanol solution with a β-phenethylhalide to yield 1-(β-phenethyl)-2-benzyl-3,4,5,6-tetrahydropyrimidine (VIIIa), as the hydrohalide salts.

If 1-(β-phenethyl)-2-benzyl-6-methyl-3,4,5,6-tetrahydropyrimidine is the end product desired, β-phenethylamine (1) is reacted with 3-butenenitrile (IIb) in the presence of an organic base such as benzyltrimethyl ammonium hydroxide (Triton B) as a catalyst. In the course of that reaction 3-butenenitrile re-arranges to crotonitrile (IIc) and the reaction product is 3-(β-phenethylamino)-butyronitrile (IIIb). Reduction of the latter with lithium aluminum hydride gives the corresponding diamine, 3-(β-phenethylamino)-butylamine (IVb). The diamine (IVb) is transformed to its bis-p-toluenesulfonic salt and can then be reacted with phenylacetonitrile according to the method of Oxley and Short (J. Chem. Soc., 1950, pp. 859–864) to yield 1-(β-phenethyl)-2-benzyl-6-methyl-3,4,5,6-tetrahydropyrimidine (VIIIb), which may then be converted to one of its pharmacologically acceptable salts.

The above processes may be exemplified by the following formulae:

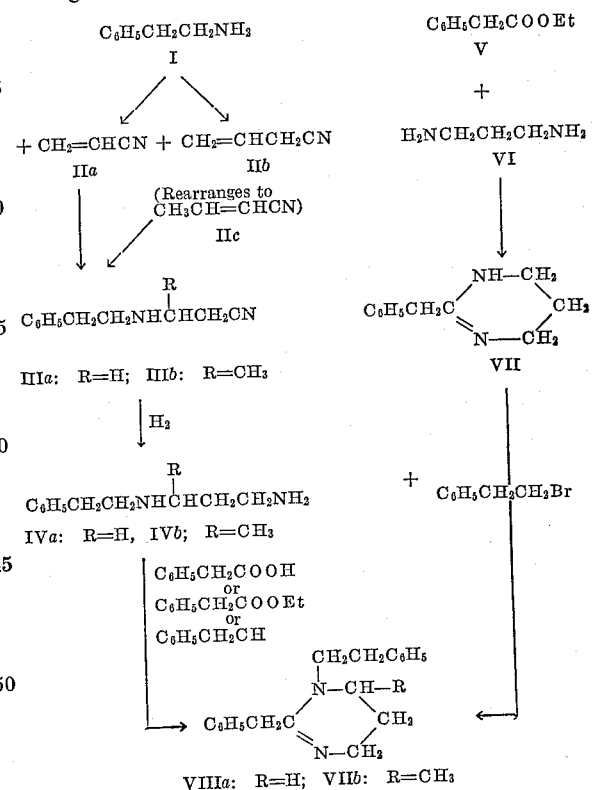

The following examples of preferred procedures will further illustrate our invention.

EXAMPLE 1

*3-(β-Phenethylamino)Propionitrile (Compound IIIa)*

208.12 g. of β-phenethylamine were added portionwise to 183.5 g. of acrylonitrile and the mixture was left standing at room temperature for twenty-four hours. The solution was then heated to reflux for two hours. The excess acrylonitrile was evaporated under reduced pressure and the residue distilled under high vacuum, B.P. 123–129° C. at 0.04 mm. A sample of the hydrochloride salt of this material was prepared for analytical purposes, M.P. 181–184° C.

Analysis confirmed the empiric formula $C_{11}H_{14}N_2 \cdot HCl$.
Required: Cl, 16.83%. Found: Cl, 16.51%.

EXAMPLE 2

3-(β-Phenethylamino)Propylamine (Compound IVa)

A suspension of 9.5 g. of lithium aluminum hydride in 500 cc. of dry ether was prepared. 41.9 g. of 3-(β-phenethylamino)propionitrile (IIIa) dissolved in 100 cc. of dry ether were added dropwise maintaining the temperature of the reaction mixture below 10° C. The cooling bath was taken away and the mixture was stirred at room temperature for thirty minutes. The reaction mixture was cooled again to 10° C. and 10 ml. of water were added dropwise followed by 25 ml. of a 25% sodium hydroxide solution and finally by 10 ml. of water. The inorganic salts were filtered on a Büchner funnel and washed with acetone. The solvent was evaporated under reduced pressure and the residue distilled under vacuum, B.P. 155–163° C. at 10 mm. A sample of the hydrochloride salt of this material was prepared for analytical purposes, M.P. 285–291° C.

Analysis confirmed the empiric formula $$C_{11}H_{18}N_2.2HCl$$

Required: Cl, 28.23%. Found: Cl, 28.03%.

Alternatively, a mixture of 500 g. (2.88 moles) of 3-(β-phenethylamino)propionitrile, 2,000 ml. of methanol, 374 grams (22 moles) of ammonia, and 50 g. of Raney nickel catalyst was put in a stainless steel bomb. The material was reduced at a pressure of 300 p.s.i. and at a temperature of 40° C. for a period of forty-three hours. The catalyst was filtered off, the solvent evaporated under reduced pressure, and the product distilled under vacuum to yield 3-(β-phenethylamino)propylamine, boiling at 97–100° C. at 0.5 to 0.7 mm.

EXAMPLE 3

1-(β-Phenethyl)-2-Benzyl-3,4,5,6-Tetrahydropyrimidine (Compound VIIIa)

32.9 g. of 3-(β-phenethylamino)propylamine IVa and 24.5 g. of phenylacetic acid were heated at 240° C. for thirty minutes and the water was distilled off as it was formed. The product was then distilled under high vacuum, B.P. 165–171° C. at 0.08 mm. The hydrobromide salt, M.P. 186–188° C., was prepared by conventional means.

Analysis confirmed the empiric formula $$C_{19}H_{22}N_2.HBr$$

Required: Br, 22.24%. Found: Br, 23.07%.

Alternatively, 30.2 g. of 3-(β-phenethylamino) propylamine IVa and 25.1 g. of ethyl phenylacetate were heated at 240–245° C. for thirty minutes distilling off the ethanol as it was formed. The reaction mixture was then cooled and the thick oily material was distilled under high vacuum, B.P. 160–175° C. at 0.07 mm. The hydrobromide salt, M.P. 181–184° C., was prepared as above.

In an additional alternate procedure, 1,120 g. (4.46 mols) of 3-(β-phenethylamino)propylamine dihydrochloride, 795 g. (4.46 moles) of the free base of the above diamine, and 1,043 g. (8.92 moles) of phenylacetonitrile were stirred and heated gradually to a temperature of 200° C. The reaction mixture was maintained at that temperature for an additional two hours. The mixture was then dissolved in 6 litres of water, made alkaline with sodium hydroxide and the product extracted with benzene. The benzene extract was washed with water, dried over sodium sulfate, and treated with anhydrous hydrogen chloride. The product was recrystallized from isopropanol to yield 1-(β-phenethyl)-2-benzyl-3,4,5,6-tetrahydropyrimidine hydrochloride.

EXAMPLE 4

3-(β-Phenethylamino) Butyronitrile (Compound IIIb)

67.09 g. (1.0 mole) of 3-butenenitrile IIb and 121 g. (1.0 mole) of β-phenethylamine I were dissolved in 200 cc. of methanol. 4 ml. of Triton B were added dropwise to the reaction mixture which was stirred vigorously for a period of one hour. The mixture was then allowed to stand at room temperature overnight and then heated to reflux for a period of four hours. The methanol was evaporated under reduced pressure and the oily residue was dissolved in 300 cc. of benzene. The benzene solution was washed with water (4 x 50 cc.) and dried over sodium sulfate. The benzene was evaporated under reduced pressure and the residue distilled under high vacuum, B.P. 127–130° C. at 0.08 mm. A sample of the hydrochloride salt of this material was prepared for analytical purposes.

Analysis confirmed the empiric formula $C_{12}H_{16}N_2.HCl$.
Required: Cl, 15.78%. Found: Cl, 15.87%.

EXAMPLE 5

3-(β-Phenethylamino) Butylamine (Compound IVb)

A suspension of 19 gm. (0.50 mole) of lithium aluminum hydride in 500 cc. of ether was prepared. 90 g. (0.48 mole) of 3-(β-phenethylamino) butyronitrile IIIb dissolved in 200 cc. of ether were added dropwise maintaining the temperature of the reaction mixture below 10° C. throughout the addition. The reaction mixture was then allowed to reach room temperature gradually and then stirred for an additional thirty minutes. The reactants were then cooled to a temperature of 10° C. and 20 cc. of water followed by 40 cc. of 25% NaOH in water and an additional 20 cc. of water were added dropwise. The inorganic salts were filtered off, the ether was evaporated under reduced pressure and the remaining liquid distilled under vacuum, B.P. 148° C. at 10 mm. A sample of the hydrochloride salt of this material was prepared for analytical purposes, M.P. 224–225° C.

Analysis confirmed the empiric formula $$C_{12}H_{20}N_2.2HCl$$

Required: Cl, 26.74%. Found: Cl, 26.65%.

EXAMPLE 6

1-(β-Phenethyl)-2-Benzyl-6-Methyl-3,4,5,6-Tetrahydropyrimidine (Compound VIIIb)

15.7 g. of 3-(β-phenethylamino) butylamine IVb were dissolved in 50 cc. of water and a solution of 30 g. of p-toluenesulfonic acid in 100 cc. of water was added. The water was then evaporated to dryness under reduced pressure and the remaining oil crystallized on standing. The solid mass was triturated with ether and the crystals filtered on a Buchner funnel to obtain the crude bis-p-toluenesulfonic acid salt of 3-(β-phenethylamino) butylamine. 24.5 g. (0.05 mole) of the above salt, 9.6 g. (0.05 mole) of 3-(β-phenethylamino) butylamine and 5.85 g. (0.05 mole) of benzyl cyanide were mixed and heated at 200° C. for a period of nine hours. The green mass was cooled, treated with 20% sodium hydroxide in water and extracted with chloroform. The chloroform extract was washed with water, dried over sodium sulfate and evaporated under reduced pressure. The residue was distilled under high vacuum, B.P. 177–180° C. at 0.04 mm. The hydrochloride salt, M.P. 135–137° C., was prepared by conventional means.

Analysis confirmed the empiric formula $C_{20}H_{24}N_2.HCl$.
Required: N, 8.52; Cl, 10.78%. Found: N, 8.32; Cl, 10.50%.

EXAMPLE 7

2-Benzyl-3,4,5,6-Tetrahydropyrimidine (Compound VII)

129.5 g. of 1,3-propanediamine (VI) and 94.5 g. of ethyl phenylacetate V were heated at 100° C. for twelve hours in an autoclave. The reaction mixture was then filtered on a Buchner funnel and the filtrate distilled under vacuum, B.P. 176–182° C. at 8.0 mm. This material crystallized on standing at room temperature. It was recrystallized from acetone, M.P. 115–118° C.

Analysis confirmed the empiric formula $C_{11}H_{14}N_2$.

Required: C, 75.82%; H, 8.10%; N, 16.08%. Found: C, 75.93%, H, 8.02%; N, 15.72%.

EXAMPLE 8

*1-(β-Phenethyl)-2-Benzyl-3,4,5,6-Tetrahydropyrimidine (Compound VIIIa) Hydrobromide*

3.0 g. of 2-benzyl-3,4,5,6-tetrahydropyrimidine (VII) were dissolved in 25 ml. of isopropanol. 1.8 g. of sodium carbonate and 3.15 g. of β-phenethylbromide were added to the reaction mixture which was stirred and heated to reflux for a period of eighteen hours. The solvent was evaporated under reduced pressure and the remaining oily material was crystallized and recrystallized from isopropanol, M.P. 185–186° C.

Analysis confirmed the empiric formula $C_{19}H_{22}N_2 \cdot HBr$.
Required: C, 63.50%; H, 6.45%; N, 7.80%; Br, 22.24%.
Found: C, 63.84%; H, 6.32%; N, 7.34%; Br, 22.41%.

We claim:
1. A compound selected from the group which consists of compounds of the formula

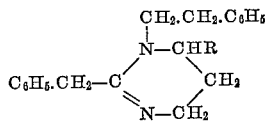

wherein $C_6H_5$ represents phenyl group and R is selected from the group consisting of hydrogen and methyl, and acid addition salts of said compounds with pharmacologically acceptable acids.

2. 1 - (β - phenethyl) - 2 - benzyl - 3,4,5,6 - tetrahydropyrimidine.

3. 1 - (β - phenethyl) - 2 - benzyl - 3,4,5,6 - tetrahydropyrimidine hydrobromide.

4. 1 - (β - phenethyl) - 2 benzyl - 6 - methyl - 3,4,5,6 - tetrahydropyrimidine hydrochloride.

References Cited in the file of this patent

UNITED STATES PATENTS

| | | |
|---|---|---|
| 2,697,708 | Hitchings et al. | Dec. 12, 1954 |
| 2,704,757 | Dornfeld | Mar. 22, 1955 |
| 2,781,398 | Morrey | Feb. 12, 1957 |
| 2,830,072 | Garritsen | Apr. 8, 1958 |
| 2,837,536 | Fox | June 3, 1958 |
| 2,919,274 | Faust et al. | Dec. 29, 1959 |
| 2,921,093 | Shapiro et al. | Jan. 12, 1960 |
| 2,946,791 | Dornfeld | July 26, 1960 |
| 2,951,078 | Biel | Aug. 30, 1960 |
| 2,965,671 | Hughes | Dec. 20, 1960 |
| 2,982,782 | Selcer | May 2, 1961 |
| 3,002,997 | Green et al. | Oct. 3, 1961 |
| 3,050,523 | Erner et al. | Aug. 21, 1962 |

UNITED STATES PATENT OFFICE
CERTIFICATE OF CORRECTION

Patent No. 3,126,381            March 24, 1964

André L. Langis et al.

It is hereby certified that error appears in the above numbered patent requiring correction and that the said Letters Patent should read as corrected below.

Column 1, line 47, after "salts" insert a comma; column 2, lines 22 to 55, the lower portion of the formulae should appear as shown below instead of as in the patent:

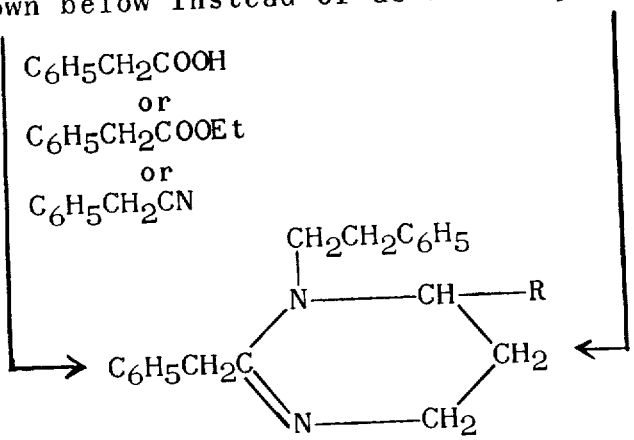

VIIIa: R=H; VIIIb: R=CH$_3$ column 3, line 57, for "mols" read -- moles --; column 5, line 27, after "represents" insert -- a --.

Signed and sealed this 29th day of September 1964.

(SEAL)
Attest:

ERNEST W. SWIDER
Attesting Officer

EDWARD J. BRENNER
Commissioner of Patents